United States Patent
Choi et al.

(10) Patent No.: US 11,921,270 B2
(45) Date of Patent: Mar. 5, 2024

(54) INSPECTION SYSTEM INCLUDING REFERENCE SPECIMEN AND METHOD OF FORMING SEMICONDUCTOR DEVICE

(71) Applicant: Samsung Electronics Co., Ltd., Suwon-si (KR)

(72) Inventors: Sungil Choi, Hwaseong-si (KR); Yeeun Park, Hwaseong-si (KR); Kyungbeom Kim, Hwaseong-si (KR); Sungyoon Ryu, Seoul (KR); Jinwoo Ahn, Yongin-si (KR); Sunhong Jun, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 267 days.

(21) Appl. No.: 17/561,276

(22) Filed: Dec. 23, 2021

(65) Prior Publication Data
US 2023/0008686 A1    Jan. 12, 2023

(30) Foreign Application Priority Data
Jul. 9, 2021 (KR) .................. 10-2021-0090224

(51) Int. Cl.
*G02B 21/02* (2006.01)
*G01J 3/28* (2006.01)
*G02B 21/00* (2006.01)
*G02B 21/36* (2006.01)

(52) U.S. Cl.
CPC ........ *G02B 21/0004* (2013.01); *G01J 3/2823* (2013.01); *G02B 21/02* (2013.01); *G02B 21/36* (2013.01)

(58) Field of Classification Search
CPC ............ G01J 3/2823; G01J 2003/2826; G02B 21/0004; G02B 21/18; G01B 11/24; G01N 21/9501; G01N 21/9505
See application file for complete search history.

(56) References Cited

U.S. PATENT DOCUMENTS

| | | | |
|---|---|---|---|
| 5,220,403 A * | 6/1993 | Batchelder | G01N 21/9505 356/450 |
| 7,342,235 B1 | 3/2008 | Harrison et al. | |
| 7,880,138 B2 * | 2/2011 | Lee | G01N 21/718 250/288 |
| 8,064,038 B2 | 11/2011 | Brouwer et al. | |
| 9,091,667 B2 | 7/2015 | Urbanowicz et al. | |

(Continued)

FOREIGN PATENT DOCUMENTS

| | | | | | |
|---|---|---|---|---|---|
| CN | 113251943 A | * | 8/2021 | ............. | G01B 11/00 |
| GB | 2231958 A | * | 11/1990 | ......... | G01N 21/6408 |
| KR | 20080003958 A | * | 1/2008 | ............. | G01B 15/02 |

*Primary Examiner* — Maurice C Smith
(74) *Attorney, Agent, or Firm* — Myers Bigel, P.A.

(57) ABSTRACT

An inspection system includes a main support die configured to receive a target specimen; an auxiliary support die adjacent to the main support die and configured to receive a reference specimen; a cleaning device configured to remove contaminants from the reference specimen; an objective lens unit configured to direct light to main support die from a light source adjacent to the objective lens unit; a spectroscope between the objective lens unit and the light source; a detector adjacent to the objective lens unit; an imaging device between the objective lens unit and the detector; and a computer system in communication with the detector.

20 Claims, 12 Drawing Sheets

(56) References Cited

U.S. PATENT DOCUMENTS

| | | | |
|---|---|---|---|
| 9,733,178 B2 | 8/2017 | Ryu et al. | |
| 10,082,461 B2 | 9/2018 | Klassen et al. | |
| 10,605,722 B2 | 3/2020 | Kwak et al. | |
| 11,004,712 B2 | 5/2021 | Ryu et al. | |
| 2005/0036143 A1 | 2/2005 | Huang | |
| 2006/0289789 A1* | 12/2006 | Raymond | G01N 21/47 |
| | | | 250/459.1 |
| 2014/0166632 A1* | 6/2014 | McWhirter | B65D 5/029 |
| | | | 219/121.61 |
| 2017/0200658 A1 | 7/2017 | Yang et al. | |
| 2020/0176292 A1* | 6/2020 | Ryu | H01L 21/67288 |

\* cited by examiner

INSPECTION SYSTEM INCLUDING REFERENCE SPECIMEN AND METHOD OF FORMING SEMICONDUCTOR DEVICE

CROSS-REFERENCE TO THE RELATED APPLICATION

This non-provisional patent application claims priority from Korean Patent Application No. 10-2021-0090224, filed on Jul. 9, 2021, in the Korean Intellectual Property Office, the disclosure of which is incorporated herein by reference in its entirety.

BACKGROUND

1. Field

The example embodiments of the disclosure relate to an inspection system including a reference specimen, an operating method thereof, and a method of forming a semiconductor device using the same.

2. Description of the Related Art

A semiconductor device is widely used in accordance with high integration and multifunctionalization thereof. The semiconductor device may be formed through a plurality of manufacturing processes such as a thin film formation process, a patterning process, an ion implantation process, and a cleaning process. The semiconductor device may include a plurality of patterns and a plurality of layers. It may be possible to discriminate a state of the plurality of patterns or the plurality of layers by performing an inspection process during execution of the plurality of manufacturing processes or after execution of each unit process. The inspection process may be used in early failure detection, optimization of each unit process, etc.

SUMMARY

The example embodiments of the disclosure provide an inspection system capable of achieving accurate inspection while having an excellent operation rate, an operating method thereof, and a method of forming a semiconductor device using the same.

An inspection system according to example embodiments of the disclosure includes a main support die that is configured to receive a target specimen. An auxiliary support die adjacent to the main support die is configured to receive a reference specimen. A cleaning device configured to remove contaminants from the reference specimen is provided. An objective lens unit is configured to direct light to the main support die from a light source adjacent to the objective lens unit. A spectroscope is disposed between the objective lens unit and the light source. A detector adjacent to the objective lens unit is provided. An imaging device is disposed between the objective lens unit and the detector. A computer system in communication with the detector is provided.

An inspection method according to example embodiments of the disclosure includes providing the inspection system. Analyzing a contaminated state of the reference specimen, cleaning the reference specimen, acquiring a reference signal of the reference specimen, acquiring a target signal of the target specimen, and comparatively analyzing the target signal and the reference signal are executed.

A method of forming a semiconductor device in accordance with example embodiments of the disclosure includes providing the inspection system. Forming a plurality of patterns on a semiconductor substrate, analyzing a contaminated state of the reference specimen, cleaning the reference specimen, acquiring a reference signal of the reference specimen, acquiring a target signal of the plurality of patterns. And comparatively analyzing the target signal and the reference signal are executed.

A spectro-microscopic inspection (SMI) system according to example embodiments of the disclosure includes a main support die configured to receive a target specimen. An auxiliary support die adjacent to the main support die is configured to receive a reference specimen. A cleaning device configured to remove contaminants the reference specimen is provided. An objective lens unit configured to direct light to the main support die from a light source adjacent to the objective lens unit. A spectroscope is disposed between the objective lens unit and the light source. A polarizer is disposed between the objective lens unit and the spectroscope. A compensator is disposed between the objective lens unit and the polarizer. A detector disposed adjacent to the objective lens unit while including a large-area charge coupled device is provided. An imaging device is disposed between the objective lens unit and the detector. A computer system in communication with the detector is provided.

DETAILED DESCRIPTION OF EXAMPLE EMBODIMENTS

Figure 1:
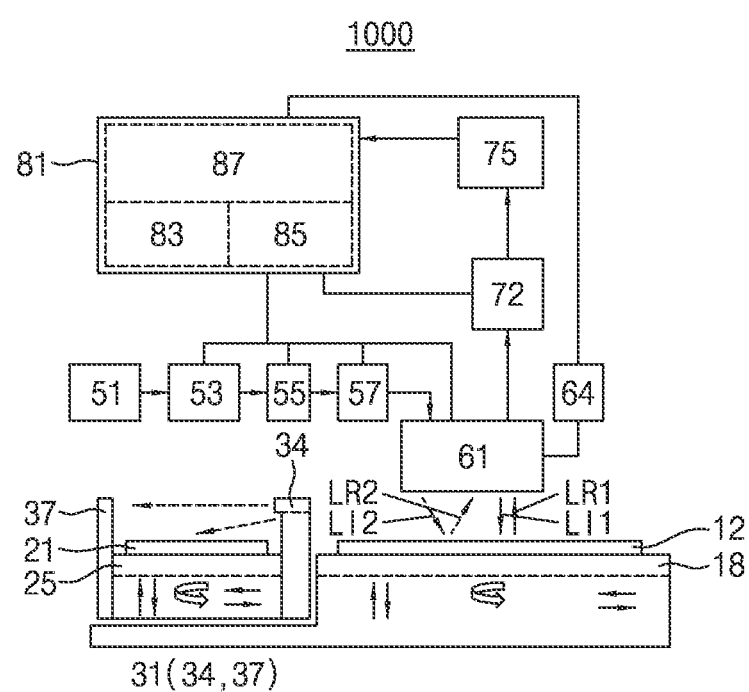
FIG. 1 is a schematic view explaining an inspection system according to example embodiments of the disclosure and an operating method thereof.

FIG. 1 is a schematic view explaining an inspection system 1000 according to example embodiments of the disclosure and an operating method thereof. The inspection system 1000 may include a spectro-microscopic inspection (SMI) system, imaging spectroscopic reflectometry (ISR), a spectroscopic reflectometer (SR), an imaging spectroscopic ellipsometer (ISE), a spectroscopic ellipsometer (SE), or a combination thereof. The inspection system 1000 may be used for a non-destructive test.

Referring to FIG. 1, the inspection system 1000 according to the example embodiments of the disclosure may include a main support die 18, a first reference specimen 21, a first auxiliary support die 25, a first cleaning device 31, a light source 51, a spectroscope 53, a polarizer 55, a compensator 57, an objective lens unit 61, an angle/focus adjuster 64, an imaging device 72, a detector 75, and a computer system 81. A target specimen 12 may be seated on the main support die 18. The first cleaning device 31 may include a first gas ejector 34 and a first exhaust device 37. The computer system 81 may include a processor 83, a controller 85, and a display 87.

The light source 51 may include a broadband light source. The light source 51 may include light ranging from ultraviolet to near infrared. In some embodiments, the light source 51 may include a laser-driven light source (LDLS). The light source 51 may have a wavelength range of 170 to 2,500 nm.

The spectroscope 53 may be disposed between the light source 51 and the polarizer 55. The polarizer 55 may be disposed between the spectroscope 53 and the compensator 57. The compensator 57 may be disposed between the polarizer 55 and the objective lens unit 61. The objective lens unit 61 may include one lens or a plurality of lenses. The angle/focus adjuster 64 may control angles and focuses of the spectroscope 53, the polarizer 55, the compensator 57, the objective lens unit 61, the imaging device 72, and the detector 75. The imaging device 72 may be disposed between the objective lens unit 61 and the detector 75.

The detector 75 may be connected to the computer system 81. The detector 75 may include a charge coupled device (CCD), a complementary metal oxide semiconductor (CMOS) image sensor, or a combination thereof. In some embodiments, the detector 75 may include a large-area charge coupled device (CCD). The computer system 81 may be connected to the spectroscope 53, the polarizer 55, the compensator 57, the objective lens unit 61, the angle/focus adjuster 64, and the imaging device 72.

The inspection system 1000 may include a vertical spectroscopic analyzer, a spectroscopic ellipsometer, or a combination thereof. In some embodiments, the inspection system 1000 may be a spectro-microscopic inspection (SMI) system. In some embodiments, the inspection system 1000 may perform optical critical dimension (OCD) analysis, three-dimensional structure analysis, thin film thickness analysis, reflectivity analysis, absorption rate analysis, optical constant analysis and material characteristic analysis for the target specimen 12.

In some embodiments, the inspection system 1000 may be an apparatus using first incident light LI1 and first reflected light LR1. Each of the first incident light LI1 and the first reflected light LR1 may be substantially perpendicular to a surface of the target specimen 12. Each of the first incident light LI1 and the first reflected light LR1 may have an angle of 88 to 92 degrees with respect to the surface of the target specimen 12. The first incident light LI1 may be irradiated from the light source 51 onto the target specimen 12 via the spectroscope 53, the polarizer 55, the compensator 57 and the objective lens unit 61. The spectroscope 53 may include a monochromator. The spectroscope 53, the polarizer 55, and the compensator 57 may function to vary the wavelength of the first incident light LI1.

The first reflected light LR1 reflected from the target specimen 12 may be transferred to the detector 75 via the objective lens unit 61 and the imaging device 72. The imaging device 72 may include at least one of a polarizer, a compensator and an analyzer. An optical signal of the first reflected light LR1 detected by the detector 75 may be transferred to the computer system 81. In some embodiments, the optical signal detected by the detector 75 may include spectral data. The computer system 81 may be configured to store and process the optical signal detected by the detector 75.

In some embodiments, the inspection system 1000 may be an apparatus using second incident light LI2 and second reflected light LR2. Each of the second incident light LI2 and the second reflected light LR2 may have an angle of 50 to 80 degrees with respect to the surface of the target specimen 12. Each of the second incident light LI2 and the second reflected light LR2 may have an angle of about 65 degrees with respect to the surface of the target specimen 12. The objective lens unit 61 may include a light incident lens, and a light receiving lens spaced apart from the light incident lens and is configured such that incident light passes through the light incident lens to the surface of the target specimen 12 and reflected light from the target specimen 12 is received by the light receiving lens. The second incident light LI2 may be irradiated from the light source 51 onto the target specimen 12 via the spectroscope 53, the polarizer 55, the compensator 57 and the light incident lens of the objective lens unit 61. The second reflected light LR2 reflected from the target specimen 12 may be transferred to the detector 75 via the light receiving lens of the objective lens unit 61 and the imaging device 72.

The objective lens unit 61 may be disposed on the main support die 18 and is configured to direct light to the main support die. The main support die 18 may include a vacuum chuck, an electrostatic chuck (an ESD chuck), a clamping chuck, or a combination thereof. The target specimen 12 may be loaded on the main support die 18. The main support die 18 may function to move the target specimen 12 such that the target specimen 12 performs horizontal movement, vertical movement and rotational movement.

The target specimen 12 may include a semiconductor substrate such as a silicon wafer, a silicon-on-insulator (SOI) wafer, or a combination thereof. In some embodiments, the target specimen 12 may include a three-dimensional structure including a plurality of layers, a plurality of patterns or a combination thereof formed on the semiconductor substrate.

The first auxiliary support die 25 may be disposed adjacent to the main support die 18. In some embodiments, the first auxiliary support die 25 may be mounted to a side surface of the main support die 18. The first auxiliary support die 25 may perform horizontal movement, vertical movement and rotational movement by the main support die 18. A top surface of the first auxiliary support die 25 may be substantially coplanar with a top surface of the main support die 18.

The first reference specimen 21 may be mounted on the first auxiliary support die 25. The first auxiliary support die 25 may perform horizontal movement, vertical movement and rotational movement, independently of the main support die 18. A top surface of the first reference specimen 21 may be substantially coplanar with a top surface of the target specimen 12. The first cleaning device 31 may be disposed adjacent to the first auxiliary support die 25 and the first reference specimen 21. The first auxiliary support die 25 and the first reference specimen 21 may be disposed between the first gas ejector 34 and the first exhaust device 37.

Figure 2:
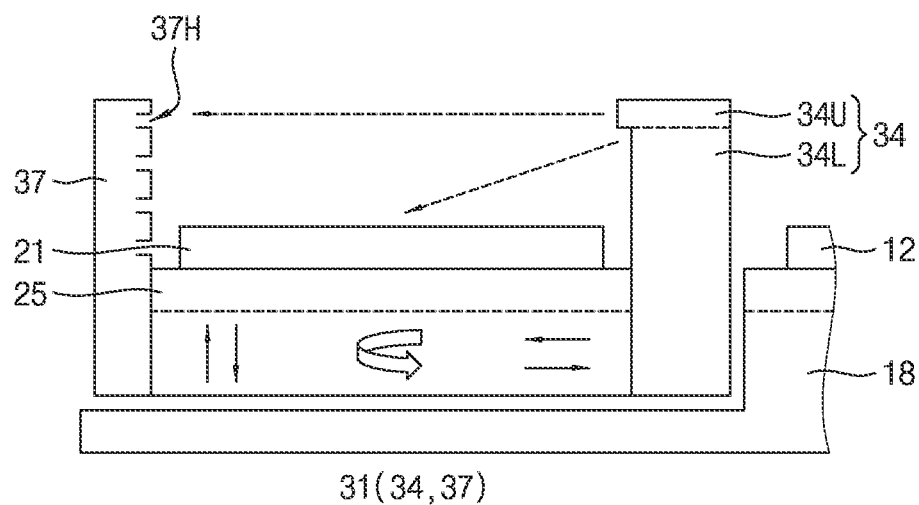
FIGS. 2 and 3 are enlarged views showing a portion of FIG. 1.
Figure 3:
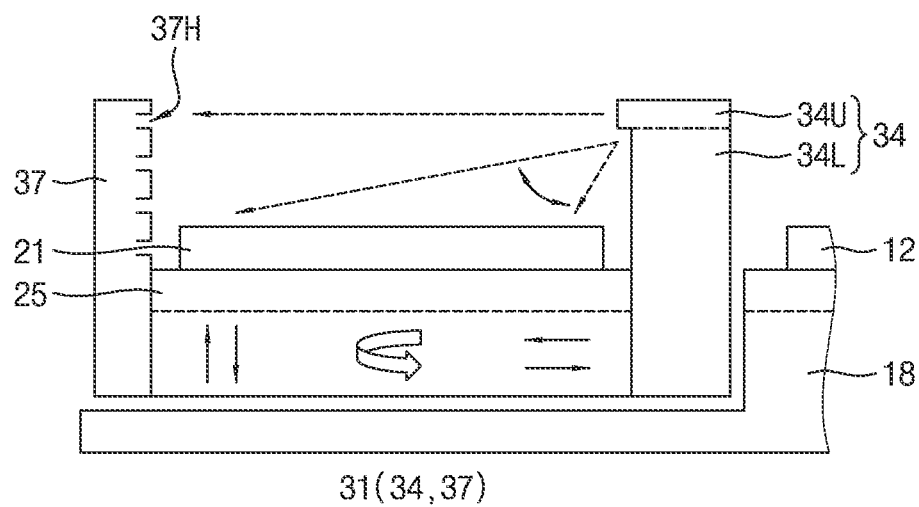

FIGS. 2 and 3 are enlarged views showing a portion of FIG. 1.

Referring to FIG. 2, the first gas ejector 34 may include a lower ejector 34L, and an upper ejector 34U on the lower ejector 34L. The first gas ejector 34 may inject a cleaning gas such as nitrogen gas, clean dry air (CDA), or a combination thereof. The first gas ejector 34 may inject the cleaning gas at various densities and various pressures using a continuous injection method, an intermittent injection method, or a combination thereof.

The lower ejector 34L may inject the cleaning gas toward the first reference specimen 21. The lower ejector 34L may inject the cleaning gas in an inclined direction. A contaminant material on the first reference specimen 21 may be removed by the cleaning gas injected from the lower ejector 34L. The upper ejector 34U may be disposed at a higher level than the lower ejector 34L. The upper ejector 34U may inject the cleaning gas to a higher level than the lower ejector 34L. The upper ejector 34U may inject the cleaning gas in a horizontal direction. The upper ejector 34U may inject the cleaning gas in a direction parallel to the top surface of the first reference specimen 21. The cleaning gas injected from the upper ejector 34U may function as a gas curtain. The upper ejector 34U may function to prevent a contaminant material separated from the first reference specimen 21 by the lower ejector 34L from scattering toward the target specimen 12 or the main support die 18.

The first exhaust device 37 may be disposed to face the first gas ejector 34. The first exhaust device 37 may include a plurality of openings 37H communicating with an exhaust line or an exhaust pump. The plurality of openings 37H may include a hole, a slit, or a combination thereof. Some of the plurality of openings 37H may be disposed to face the upper ejector 34U. Some of the plurality of openings 37H may be aligned at substantially the same level as the cleaning gas injected from the upper ejector 34U. The first exhaust device 37 may function to exhaust a contaminant material separated from the first reference specimen 21 and the cleaning gas injected from the first gas ejector 34. The first exhaust device 37 may function to prevent a contaminant material separated from the first reference specimen 21 from scattering toward another peripheral device. The first exhaust device 37 may function to prevent a contaminant material separated from the first reference specimen 21 from scattering toward the target specimen 12 or the main support die 18.

Referring to FIG. 3, the lower ejector 34L may inject the cleaning gas toward the first reference specimen 21 at various inclination angles.

Figure 4:
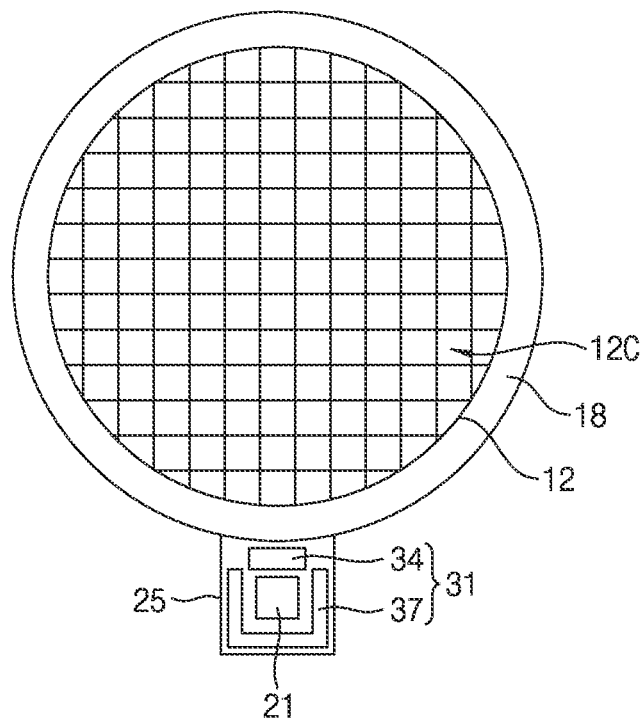
FIG. 4 is a plan view showing a part of configurations in FIG. 1.

FIG. 4 is a plan view showing a part of configurations in FIG. 1.

Referring to FIG. 4, in some embodiments, the target specimen 12 may include a semiconductor substrate including a plurality of semiconductor chips 12C. The plurality of semiconductor chips 12C may include a three-dimensional structure including a plurality of layers, a plurality of patterns or a combination thereof formed on the semiconductor substrate. The target specimen 12 may be seated on the main support die 18. The first reference specimen 21, the first auxiliary support die 25, and the first cleaning device 31 may be disposed at one side of the main support die 18. The first cleaning device 31 may include the first gas ejector 34 and the first exhaust device 37. The first reference specimen 21 may be disposed between the first gas ejector 34 and the first exhaust device 37.

FIGS. 5 to 13 are enlarged views showing a portion of FIG. 4.

Figure 5:
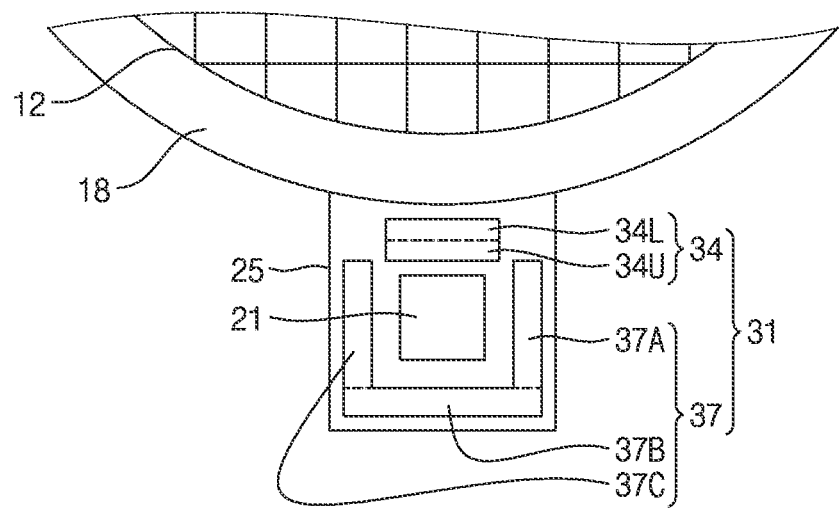
FIGS. 5 to 13 are enlarged views showing a portion of FIG. 4.

Referring to FIG. 5, the first gas ejector 34 may be disposed between the first reference specimen 21 and the main support die 18. The first gas ejector 34 may be disposed between the first reference specimen 21 and the target specimen 12. The first exhaust device 37 may include a first section 37A, a second section 37B, and a third section 37C. The second section 37B may be disposed to face the first gas ejector 34. The first reference specimen 21 may be disposed between the second section 37B and the first gas ejector 34. The first section 37A and the third section 37C may be disposed between the second section 37B and the first gas ejector 34. The first section 37A and the third section 37C may be spaced apart from each other. The first section 37A and the third section 37C may communicate with the second section 37B. The first reference specimen 21 may be disposed between the first section 37A and the third section 37C.

Figure 6:
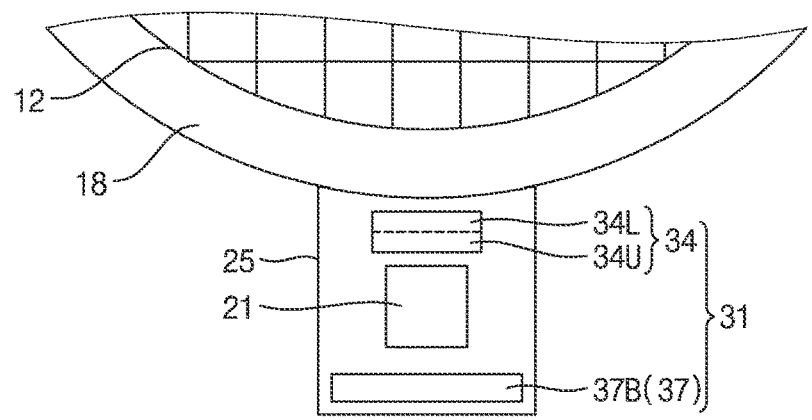

Referring to FIG. 6, the first exhaust device 37 may include a second section 37B. The second section 37B may be disposed to face the first gas ejector 34. The first reference specimen 21 may be disposed between the second section 37B and the first gas ejector 34.

Figure 7:
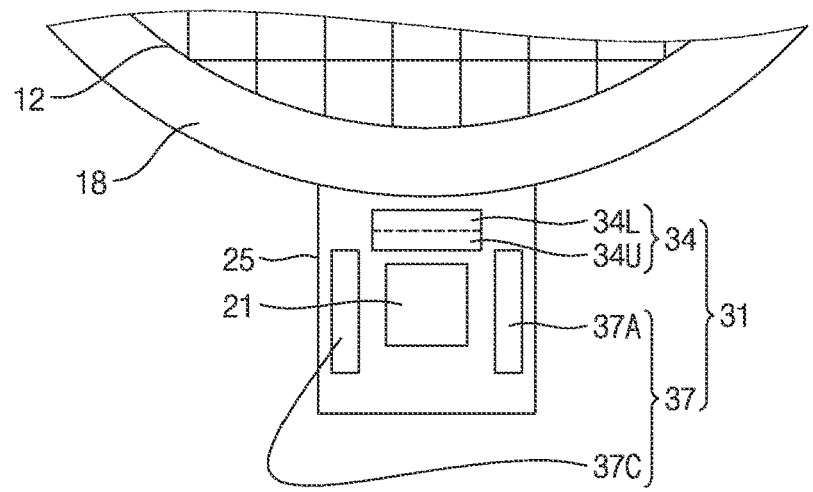

Referring to FIG. 7, the first exhaust device 37 may include a first section 37A and a third section 37C. The first section 37A and the third section 37C may be spaced apart from each other. The minimum distance between the target specimen 12 and each of the first section 37A and the third section 37C may be greater than the minimum distance between the first gas ejector 34 and the target specimen 12. The first reference specimen 21 may be disposed between the first section 37A and the third section 37C. The first gas ejector 34 may be disposed between the first reference specimen 21 and the target specimen 12. The first gas ejector 34 may be disposed between the first section 37A and the third section 37C and between the first reference specimen 21 and the target specimen 12.

Figure 8:
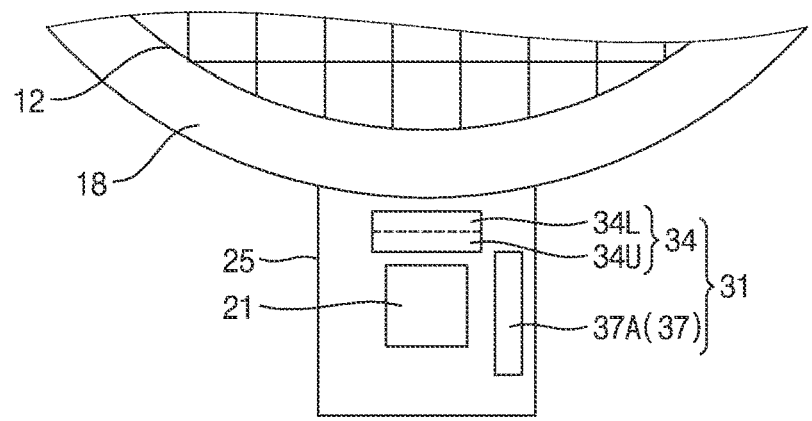

Referring to FIG. 8, the first exhaust device 37 may include a first section 37A. The minimum distance between the first section 37A and the target specimen 12 may be greater than the minimum distance between the first gas ejector 34 and the target specimen 12. The first section 37A may be disposed at one side of the first reference specimen 21. The first gas ejector 34 may be disposed between the first reference specimen 21 and the target specimen 12. The first gas ejector 34 may be disposed among the first section 37A, the first reference specimen 21 and the target specimen 12.

Figure 9:
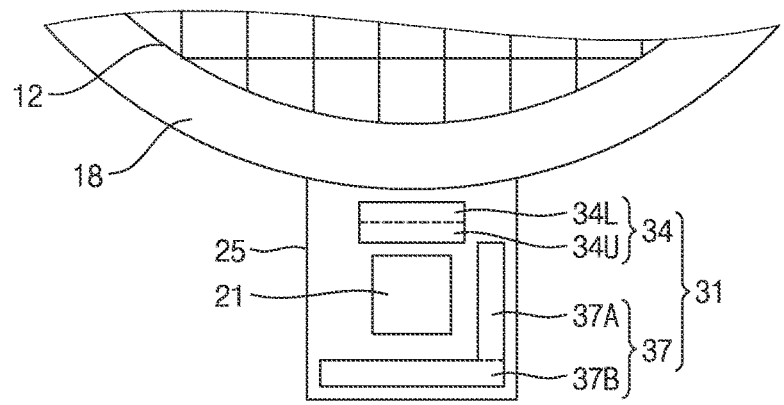

Referring to FIG. 9, the first exhaust device 37 may include a first section 37A and a second section 37B. The second section 37B may be disposed to face the first gas ejector 34. The first reference specimen 21 may be disposed between the second section 37B and the first gas ejector 34. The first section 37A may be disposed at one side of the first reference specimen 21. The first section 37A may be disposed between the second section 37B and the first gas ejector 34. The first section 37A may communicate with the second section 37B.

Figure 10:
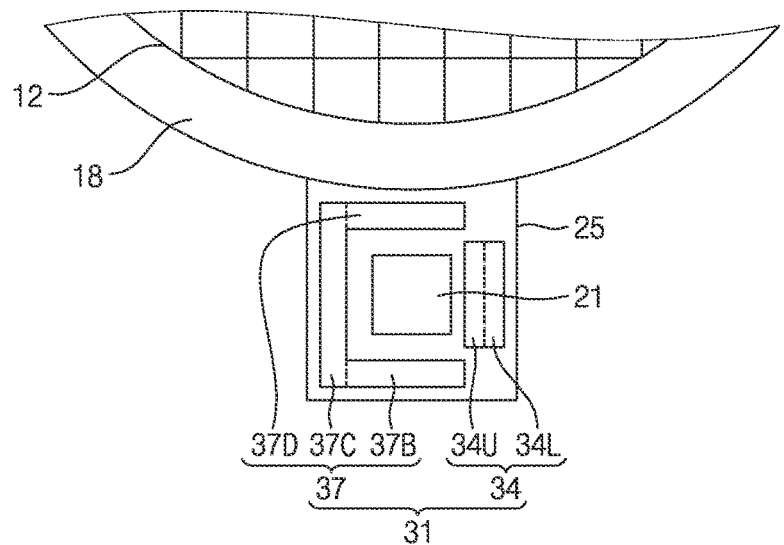

Referring to FIG. 10, the first gas ejector 34 may be disposed at one side of the first reference specimen 21. The first exhaust device 37 may include a second section 37B, a third section 37C, and a fourth section 37D. The third section 37C may be disposed to face the first gas ejector 34. The first reference specimen 21 may be disposed between the third section 37C and the first gas ejector 34. The fourth section 37D may be disposed between the first reference specimen 21 and the target specimen 12. The fourth section 37D may communicate with the third section 37C. The second section 37B may be disposed to face the fourth section 37D. The second section 37B may communicate with the third section 37C. The first reference specimen 21 may be disposed between the second section 37B and the fourth section 37D.

Figure 11:
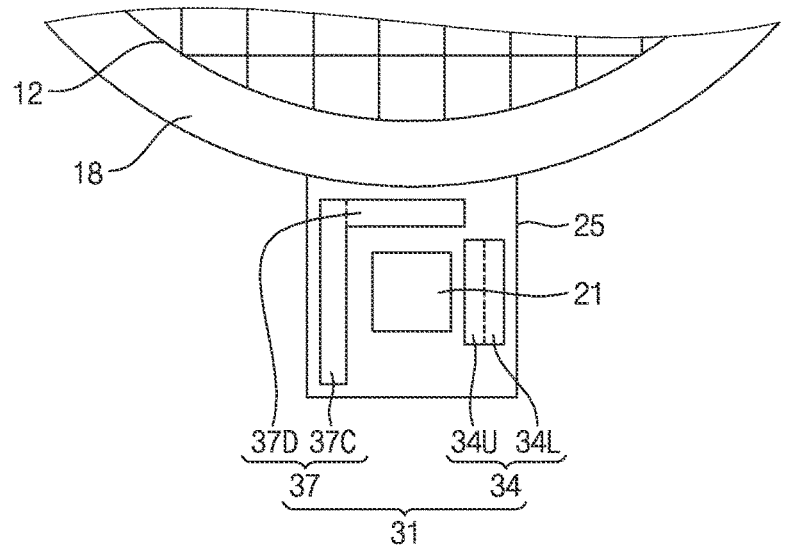

Referring to FIG. 11, the first exhaust device 37 may include a third section 37C and a fourth section 37D. The third section 37C may be disposed to face the first gas ejector 34. The fourth section 37D may be disposed between the first reference specimen 21 and the target specimen 12. The fourth section 37D may communicate with the third section 37C.

Figure 12:
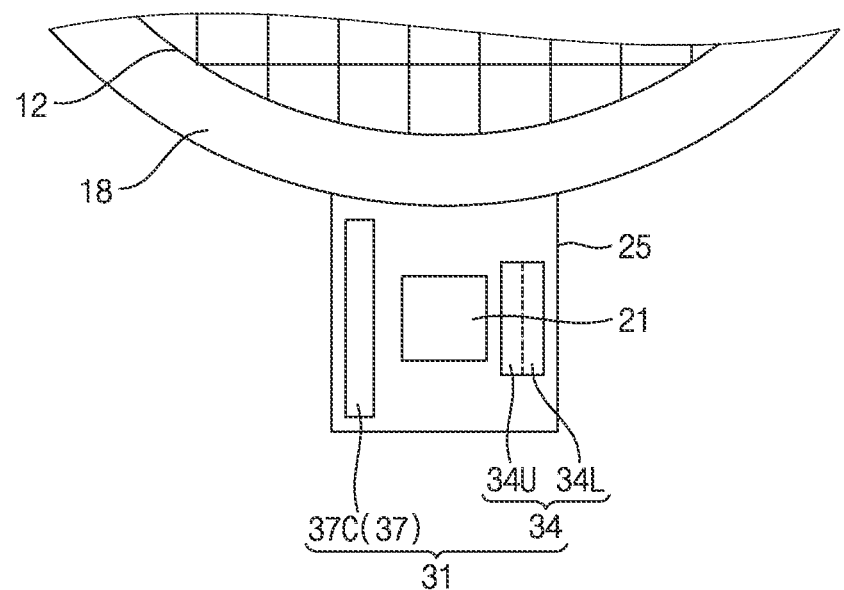

Referring to FIG. 12, the first exhaust device 37 may include a third section 37C. The third section 37C may be disposed to face the first gas ejector 34. The first reference specimen 21 may be disposed between the third section 37C and the first gas ejector 34.

Figure 13:
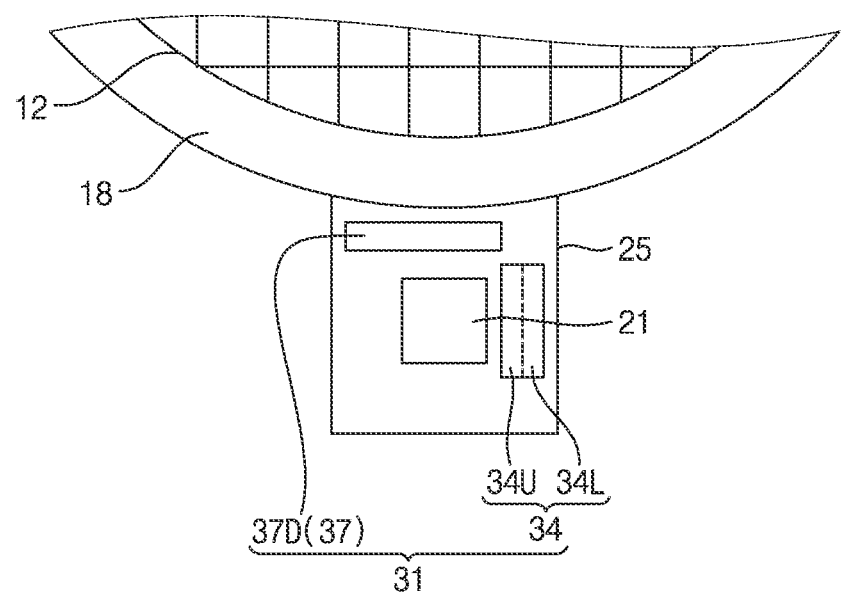

Referring to FIG. 13, the first exhaust device 37 may include a fourth section 37D. The fourth section 37D may be disposed between the first reference specimen 21 and the target specimen 12.

Figure 14:
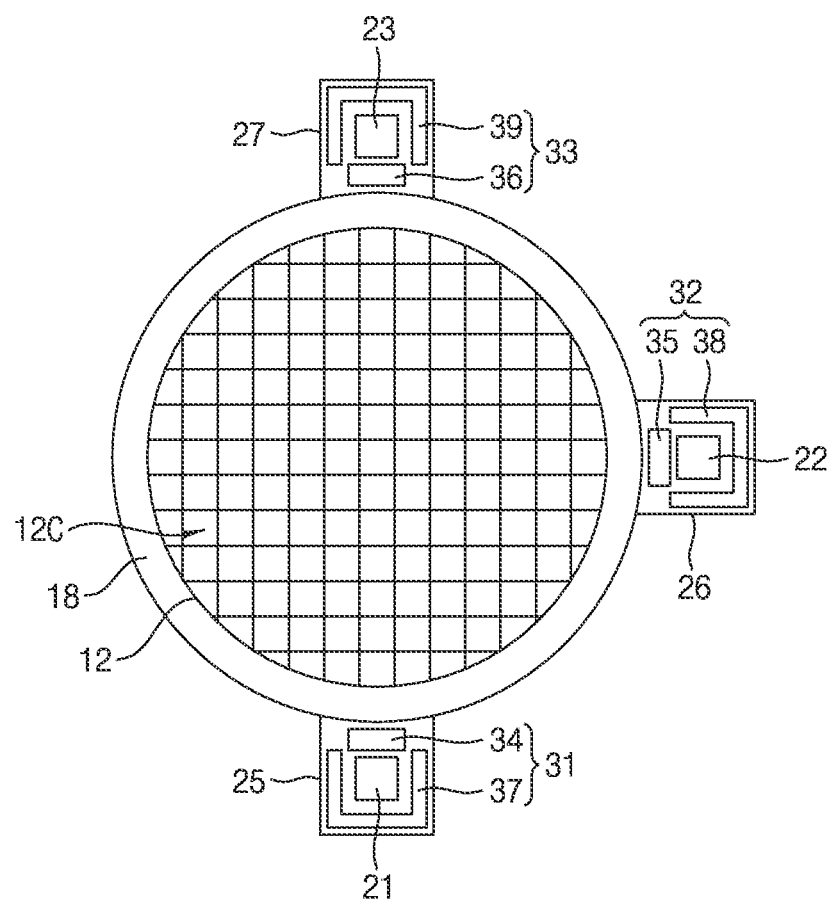
FIG. 14 is a plan view showing a part of the configurations of FIG. 1.

FIG. 14 is a plan view showing a part of the configurations of FIG. 1.

Referring to FIG. 12, in some embodiments, the target specimen 12 may be seated on the main support die 18. The first reference specimen 21, the first auxiliary support die 25, and the first cleaning device 31 may be disposed at one side of the main support die 18. The first cleaning device 31 may include the first gas ejector 34 and the first exhaust device 37. The first reference specimen 21 may be disposed between the first gas ejector 34 and the first exhaust device 37.

A second reference specimen 22, a second auxiliary support die 26, and a second cleaning device 32 may be disposed at a second side of the main support die 18. The second cleaning device 32 may include a second gas ejector 35 and a second exhaust device 38. The second reference specimen 22, the second auxiliary support die 26, and the second cleaning device 32 may include configurations similar to those of the first reference specimen 21, the first auxiliary support die 25, and the first cleaning device 31, respectively.

A third reference specimen 23, a third auxiliary support die 27, and a third cleaning device 33 may be disposed at a third side of the main support die 18. The third cleaning device 33 may include a third gas ejector 36 and a third exhaust device 39. The third reference specimen 23, the third auxiliary support die 27, and the third cleaning device 33 may include configurations similar to those of the first reference specimen 21, the first auxiliary support die 25, and the first cleaning device 31, respectively.

Figure 15:
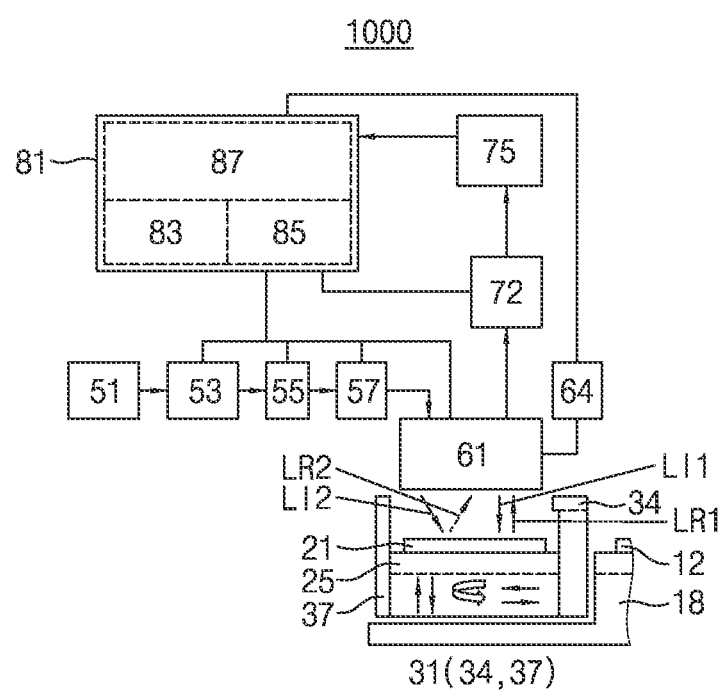
FIGS. 15 and 16 are schematic views explaining an inspection system according to example embodiments of the disclosure and an operating method thereof.
Figure 16:
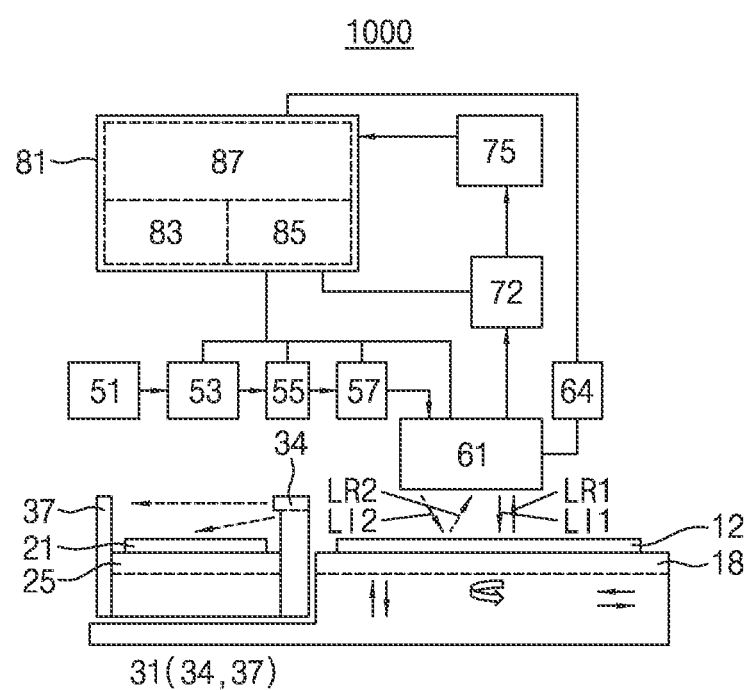

FIGS. 15 and 16 are schematic views explaining an inspection system according to example embodiments of the disclosure and an operating method thereof.

Referring to FIG. 15, a main support die 18 and a first auxiliary support die 25 may move, thereby aligning a first reference specimen 21 under an objective lens unit 61. First incident light LI1 or second incident light LI2 may be irradiated onto the first reference specimen 21. First reflected light LR1 or second reflected light LR2 reflected from the first reference specimen 21 may be transferred to a detector 75. An optical signal of the first reflected light LR1 or the second reflected light LR2 detected by the detector 75 may be transferred to the computer system 81.

Referring to FIG. 16, a first auxiliary support die 25 may be disposed adjacent to a main support die 18. In some embodiments, the first auxiliary support die 25 may be mounted to a side surface of the main support die 18. The first auxiliary support die 25 may perform horizontal movement, vertical movement and rotational movement by the main support die 18. A top surface of the first auxiliary support die 25 may be substantially coplanar with a top surface of the main support die 18. A first reference specimen 21 may be mounted on the first auxiliary support die 25. A top surface of the first reference specimen 21 may be substantially coplanar with a top surface of a target specimen 12. A first cleaning device 31 may be disposed adjacent to the first auxiliary support die 25 and the first reference specimen 21.

Figure 17:
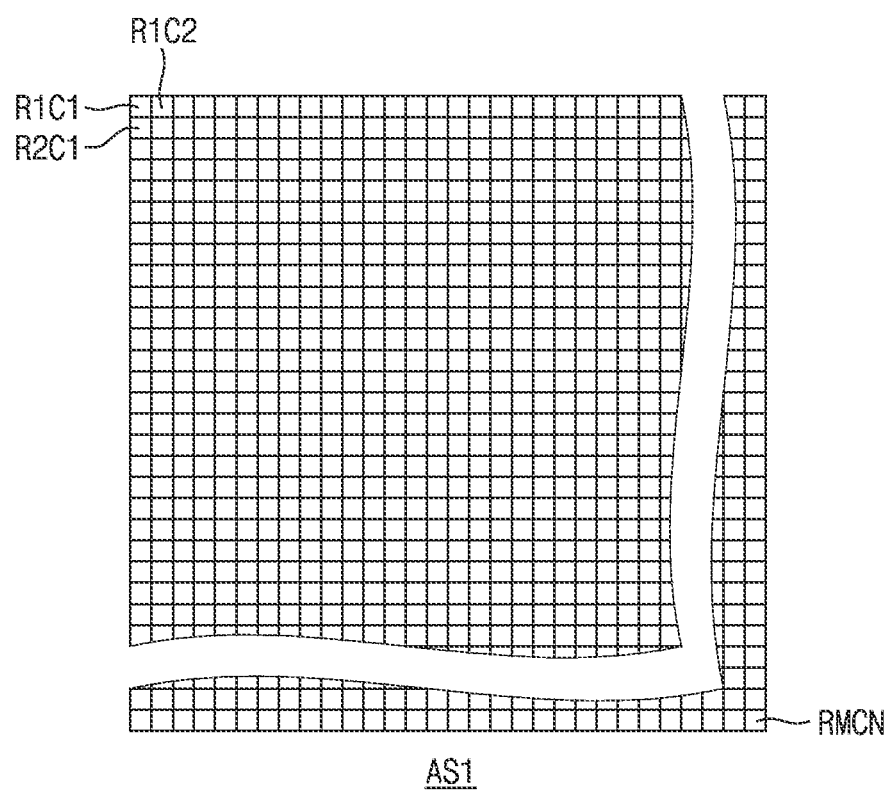
FIG. 17 is a view explaining a signal acquisition method of the inspection system according to the example embodiments of the disclosure.

FIG. 17 is a view explaining a signal acquisition method of the inspection system according to the example embodiments of the disclosure.

Referring to FIG. 17, the signal acquisition method of the inspection system according to the example embodiments of the disclosure may include acquiring large-area spectral information AS1 on the first reference specimen ("21" in FIG. 1) and/or the target specimen ("12" in FIG. 1).

In some embodiments, the first incident light LI1, the second incident light LI2, or a combination thereof may be irradiated from the light source 51 onto the first reference specimen 21 and/or the target specimen 12 via the spectroscope 53, the polarizer 55, the compensator 57 and the objective lens unit 61. The reflected light LR1, the second reflected light LR2 or combination thereof reflected from the first reference specimen 21 and/or the target specimen 12 may be transferred to the detector 75 via the objective lens unit 61 and the imaging device 72 and, as such, the large-area spectral information AS1 may be acquired by the detector 75.

The large-area spectral information AS1 may include a plurality of optical signals acquired at a plurality of measurement points R1C1, R1C2, R2C1, and RMCN. For example, the large-area spectral information AS1 may include at least four optical signals acquired at at least four measurement points two-dimensionally arranged on the first reference specimen 21 and/or the target specimen 12 to constitute at least two rows and at least two columns. The large-area spectral information AS1 may be transferred from the detector 75 to the computer system 81. A reference signal of the first reference specimen 21 and/or a target signal of the target specimen 12 may be acquired from the large-area spectral information AS1 using the computer system 81. The reference signal and/or the target signal may correspond to a median or a mean of the plurality of optical signals. In some embodiments, the reference signal and/or the target signal may correspond to a median or a mean of the at least four optical signals.

In some embodiments, each of the plurality of measurement points R1C1, R1C2, R2C1, and RMCN may have a size of 1 to 50 μm×1 to 50 μm. For example, each of the plurality of measurement points R1C1, R1C2, R2C1, and RMCN may have a size of about 10 μm×about 10 μm. The large-area spectral information AS1 may include a plurality of optical signals acquired at the plurality of measurement points R1C1, R1C2, R2C1, and RMCN within an area of 1 to 10 mm×1 to 10 mm on the first reference specimen 21 and/or the target specimen 12. For example, the large-area spectral information AS1 may include a plurality of optical signals acquired at the plurality of measurement points R1C1, R1C2, R2C1, and RMCN within an area of about 5 mm×about 5 mm on the first reference specimen 21 and/or the target specimen 12. The large-area spectral information AS1 may include a plurality of optical signals acquired at about 500×500 measurement points on the first reference specimen 21 and/or the target specimen 12.

Figure 18:
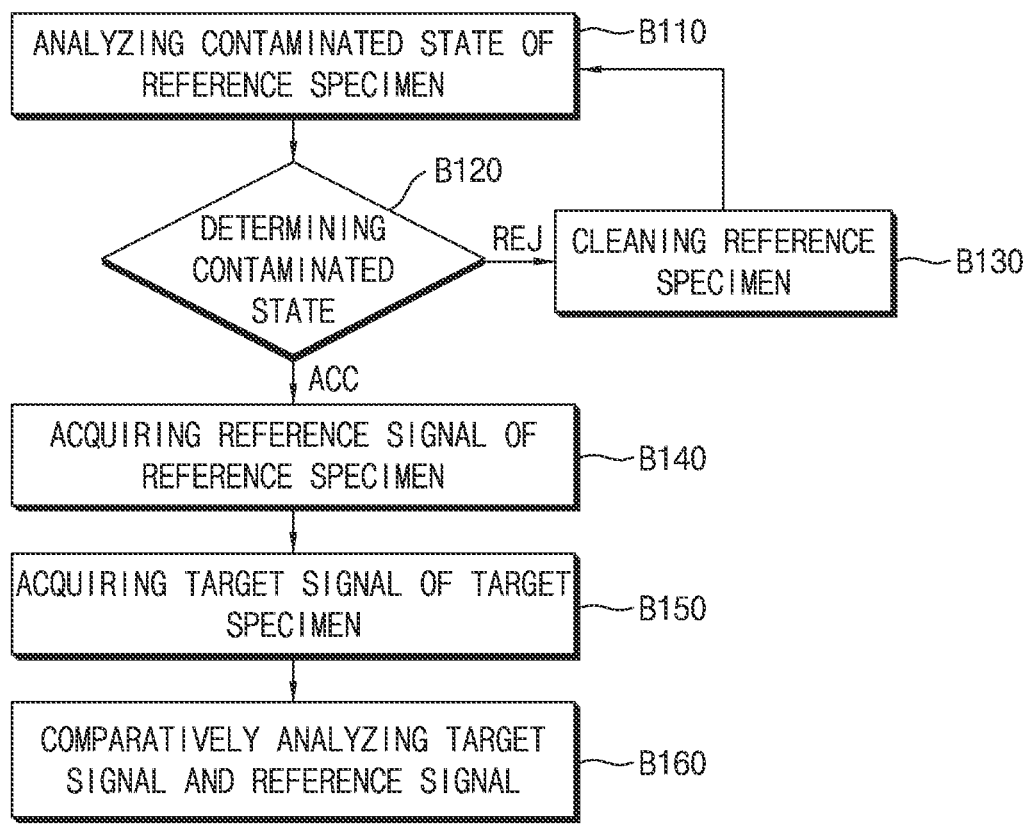
FIG. 18 is a flowchart explaining an operating method of the inspection system according to the example embodiments of the disclosure.

FIG. 18 is a flowchart explaining an operating method of the inspection system according to the example embodiments of the disclosure.

Referring to FIG. 18, the operating system of the inspection system according to the example embodiments of the disclosure and an inspection method using the inspection system may include analyzing a contaminated state of a reference specimen (B110); determining the contaminated state of the reference specimen (B120); if the state of the reference specimen indicates that the reference specimen is contaminated, cleaning the reference specimen (B130); acquiring a reference signal of the reference specimen (B140); acquiring a target signal of a target specimen (B150); and comparatively analyzing the target signal and the reference signal (B160).

In some embodiments, the analyzing of a contaminated state of the reference specimen (B110) may include aligning the first reference specimen 21 between the first auxiliary support die 25 and the objective lens unit 61, acquiring image information of the first reference specimen 21 through the detector 75, and analyzing the contaminated state from the image information using the computer system 81. The image information of the first reference specimen 21 may be acquired by sensing, by the detector 75, a signal transferred from the first reflected light LR1, the second reflected light LR2 and a combination thereof to the detector 75 via the objective lens unit 61 and the imaging device 72. The image information of the first reference specimen 21 acquired by the detector 75 may be transferred to the computer system 81.

The computer system 81 may analyze the image information of the first reference specimen 21, thereby determining the contaminated state of the first reference specimen 21 (B120). In some embodiments, the contaminated state of the first reference specimen 21 may be quantified. When the contaminated state of the first reference specimen 21 is within a manageable range ("ACC" in FIG. 18), acquiring a reference signal of the reference specimen (B140) may be executed. When the contaminated state of the first reference specimen 21 is outside of the manageable range, the first reference specimen 21 is contaminated and the reference specimen is cleaned (B130).

When the contaminated state of the first reference specimen 21 is outside the manageable range ("REJ" in FIG. 18), cleaning the reference specimen (B130) may be executed. Cleaning the reference specimen (B130) may include injecting a cleaning gas onto the first reference specimen 21 using the first cleaning device 31. Analyzing a contaminated state of the reference specimen (B110), determining the contaminated state of the reference specimen (B120), and cleaning the reference specimen (B130) may be repeatedly executed.

In some embodiments, when the contaminated state of the first reference specimen 21 is still outside the manageable range, even after analyzing a contaminated state of the reference specimen (B110), determining the contaminated state of the reference specimen (B120), and cleaning the reference specimen (B130) have been repeatedly executed a predetermined number of times, the first reference specimen 21 may be replaced.

In some embodiments, acquiring a reference signal of the reference specimen (B140) may include aligning the first reference specimen 21 between the first auxiliary support die 25 and the objective lens unit 61. Third incident light may be irradiated from the light source 51 onto the first reference specimen 21 via the spectroscope 53, the polarizer 55, the compensator 57 and the objective lens unit 61. The third incident light may include the first incident light LI1, the second incident light LI2, or a combination thereof. Third reflected light reflected from the first reference specimen 21 may be transferred to the detector 75 via the objective lens unit 61 and the imaging device 72 and, as such, first light-area spectral information may be acquired by the detector 75. The third reflected light may include the first reflected light LR1, the second reflected light LR2, or a combination thereof. Moreover, analyzing a contaminated state of the reference spectrum (B110), determining the contaminated state (B120), cleaning the reference specimen (B130) if the reference specimen is contaminated, and acquiring a reference signal of the reference specimen (B140) may be performed with respect to two or more reference specimens, such as the second reference specimen 22 and the third reference specimen 23 in FIG. 14. In some embodiments, after cleaning the reference specimen (B130) is repeatedly executed a predetermined number of times, the first reference specimen 21 may be replaced with the second reference specimen 22. After cleaning the second reference specimen 22 (B130) is repeatedly executed a predetermined number of times, the second reference specimen 22 may be replaced with the third reference specimen 23.

The first large-area spectral information may include a plurality of optical signals acquired at a plurality of measurement points. For example, the first large-area spectral information may include at least four optical signals acquired at at least four measurement points two-dimensionally arranged on the first reference specimen 21 to constitute at least two rows and at least two columns. The first large-area spectral information may be transferred from the detector 75 to the computer system 81. The reference signal may be acquired from the first large-area spectral information using the computer system 81. The reference signal may correspond to a median or a mean of the plurality of optical signals. In some embodiments, the reference signal may correspond to a median or a mean of the at least four optical signals.

Acquiring a target signal of the target specimen (B150) may include aligning the target specimen 12 between the main support die 18 and the objective lens unit 61. Fourth incident light may be irradiated from the light source 51 onto the target specimen 12 via the spectroscope 53, the polarizer 55, the compensator 57 and the objective lens unit 61. The fourth incident light may include the first incident light LI1, the second incident light LI2, or a combination thereof. Fourth reflected light reflected from the target specimen 12 reflected from the target specimen 12 may be transferred to the detector 75 via the objective lens unit 61 and the imaging device 72 and, as such, second large-area spectral information may be acquired by the detector 75. The fourth reflected light may include the first reflected light LR1, the second reflected light LR2, or a combination thereof.

The second large-area spectral information may include a plurality of optical signals acquired at a plurality of measurement points. For example, the second large-area spectral information may include at least four optical signals acquired at at least four measurement points two-dimensionally arranged on the target specimen 12 to constitute at least two rows and at least two columns. The second large-area spectral information may be transferred from the detector 75 to the computer system 81. The target signal may be acquired from the second large-area spectral information using the computer system 81. The target signal may correspond to a median or a mean of the plurality of optical signals. In some embodiments, the target signal may correspond to a median or a mean of the at least four optical signals.

The target signal and the reference signal may be comparatively analyzed using the computer system 81 (B160).

Figure 19:
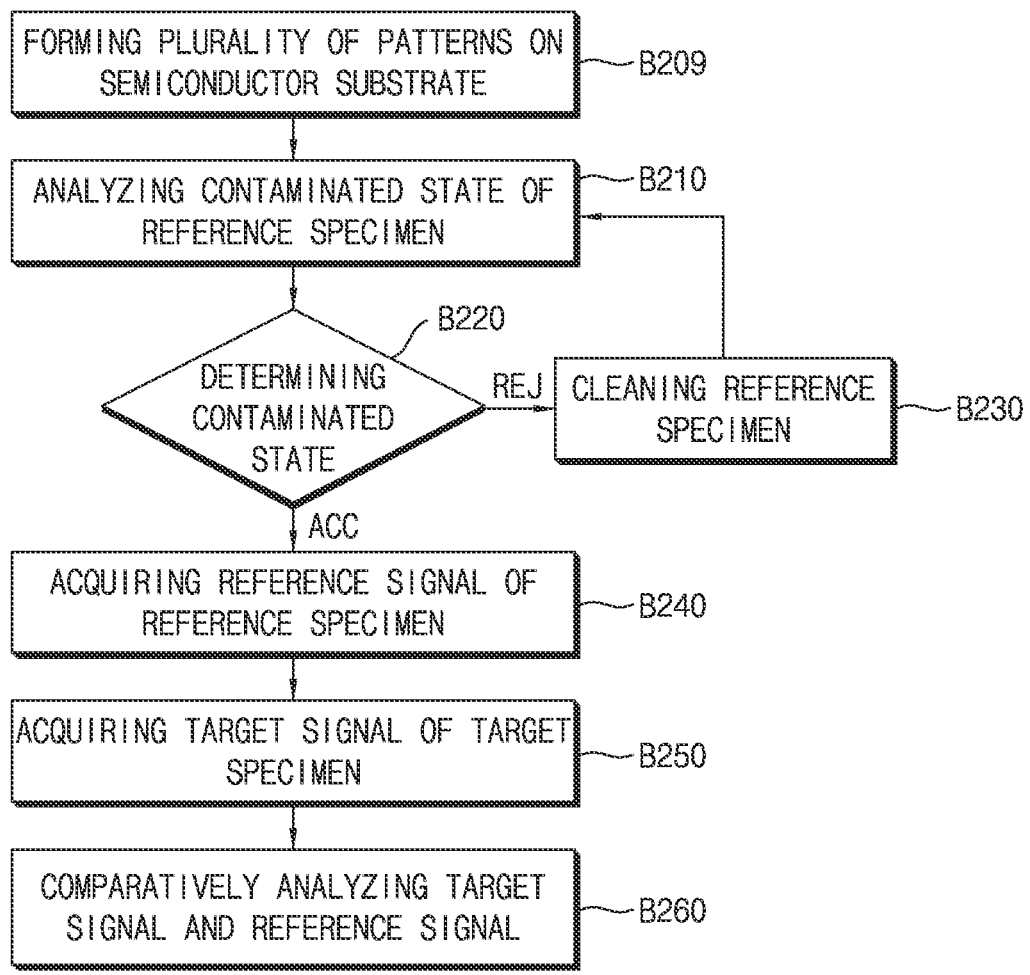
FIG. 19 is a flowchart explaining semiconductor device formation methods using an inspection system according to example embodiments of the disclosure.

FIG. 19 is a flowchart explaining semiconductor device formation methods using an inspection system according to example embodiments of the disclosure.

Referring to FIG. 19, the semiconductor device formation methods using an inspection system according to example embodiments of the disclosure may include forming a plurality of patterns on a semiconductor substrate (B209), analyzing a contaminated state of a reference specimen (B210), determining the contaminated state of the reference specimen (B220), cleaning the reference specimen (B230) if the state of the reference specimen is contaminated, acquiring a reference signal of the reference specimen (B240), acquiring a target signal of the plurality of patterns (B250), and comparatively analyzing the target signal and the reference signal (B260).

Forming a plurality of patterns on the semiconductor substrate (B209) may include a plurality of unit processes such as a plurality of thin film formation processes, a plurality of patterning processes and a plurality of ion implantation processes. A three-dimensional structure including a plurality of layers, a plurality of patterns, or a combination thereof may be formed on the semiconductor substrate. Analyzing a contaminated state of the reference specimen (B210), determining the contaminated state of the reference specimen (B220), cleaning the reference specimen (B230), and acquiring a reference signal of the reference specimen (B240) may be executed through a method similar to the method described with reference to FIGS. 1 to 18. Moreover, analyzing a contaminated state of the reference spectrum (B210), determining the contaminated state (B220), cleaning the reference specimen (B230) if the reference specimen is contaminated, and acquiring a reference signal of the reference specimen (B240) may be performed with respect to two or more reference specimens, such as the second reference specimen 22 and the third reference specimen 23 in FIG. 14.

Acquiring a target signal of the plurality of patterns (B250) may include aligning the target specimen 12 between the main support die 18 and the objective lens unit 61. The target specimen 12 may include the semiconductor substrate including the plurality of patterns. Fourth incident light may be irradiated from the light source 51 onto the target specimen 12 via the spectroscope 53, the polarizer 55, the compensator 57 and the objective lens unit 61. The fourth incident light may include the first incident light LI1, the second incident light LI2, or a combination thereof. Fourth reflected light reflected from the target specimen 12 may be transferred to the detector 75 via the objective lens unit 61 and the imaging device 72 and, as such, second large-area spectral information may be acquired by the detector 75. The fourth reflected light may include the first reflected light LR1, the second reflected light LR2, or a combination thereof. The fourth reflected light may be determined by the plurality of patterns on the semiconductor substrate.

The second large-area spectral information may include a plurality of optical signals acquired at a plurality of measurement points. For example, the second large-area spectral information may include at least four optical signals acquired at at least four measurement points two-dimensionally arranged on the target specimen 12 to constitute at least two rows and at least two columns. The second large-area spectral information may be transferred from the detector 75 to the computer system 81. The target signal may be acquired from the second large-area spectral information using the computer system 81. The target signal may correspond to a median or a mean of the plurality of optical signals. In some embodiments, the target signal may correspond to a median or a mean of the at least four optical signals. The target signal may be determined by the plurality of patterns on the semiconductor substrate.

The target signal and the reference signal may be comparatively analyzed using the computer system 81 (B260).

In accordance with the example embodiments of the disclosure, a reference specimen is disposed on an auxiliary support die adjacent to a main support die. A cleaning device configured to remove contaminants from the reference specimen is provided. The cleaning device may function to remove contaminants from the reference specimen. An inspection system capable of achieving accurate inspection while having an excellent operation rate, an inspection method using the inspection system, and a semiconductor device formation method using the inspection system may be provided.

While the embodiments of the disclosure have been described with reference to the accompanying drawings, it should be understood by those skilled in the art that various modifications may be made without departing from the scope of the disclosure and without changing features thereof. Therefore, the above-described embodiments should be considered in a descriptive sense only and not for purposes of limitation.

What is claimed is:

1. An inspection system comprising:
    a main support die configured to receive a target specimen;
    an auxiliary support die adjacent to the main support die and configured to receive a reference specimen;
    a cleaning device configured to remove contaminants from the reference specimen;
    an objective lens unit configured to direct light to main support die from a light source adjacent to the objective lens unit;
    a spectroscope between the objective lens unit and the light source;
    a detector adjacent to the objective lens unit;
    an imaging device between the objective lens unit and the detector; and
    a computer system in communication with the detector.

2. The inspection system according to claim 1, wherein:
    the cleaning device comprises
    a gas ejector injecting a cleaning gas, and
    an exhaust device adjacent to the gas ejector; and
    the reference specimen is between the gas ejector and the exhaust device.

3. The inspection system according to claim 2, wherein the gas ejector comprises:
    a lower ejector injecting the cleaning gas toward the reference specimen; and
    an upper ejector at a higher level than the lower ejector, the upper ejector injecting the cleaning gas in a direction parallel to a top surface of the reference specimen.

4. The inspection system according to claim 3, wherein:
    the exhaust device comprises a plurality of openings; and
    at least one of the plurality of openings is aligned at substantially a same level as the cleaning gas injected from the upper ejector.

5. The inspection system according to claim 2, wherein:
    the exhaust device faces the gas ejector; and
    at least a part of the exhaust device is between the reference specimen and the target specimen.

6. The inspection system according to claim 2, wherein the gas ejector is between the reference specimen and the target specimen.

7. The inspection system according to claim 6, wherein:
    the exhaust device comprises a first section, a second section, and a third section;
    the second section faces the gas ejector;
    the first section and the third section are between the second section and the gas ejector; and the reference specimen is between the first section and the third section.

8. The inspection system according to claim 1, wherein a top surface of the reference specimen is substantially coplanar with a top surface of the target specimen.

9. The inspection system according to claim 1, wherein the detector comprises a large-area charge coupled device.

10. The inspection system according to claim 1, wherein the spectroscope comprises a monochromator.

11. The inspection system according to claim 1, wherein the imaging device comprises at least one of a polarizer, a compensator, and an analyzer.

12. An inspection method comprising:
providing the inspection system of claim 1;
analyzing a contaminated state of the reference specimen to determine if the reference specimen is contaminated;
cleaning the reference specimen when the reference specimen is contaminated;
acquiring a reference signal of the reference specimen;
acquiring a target signal of the target specimen; and
comparatively analyzing the target signal and the reference signal.

13. The inspection method according to claim 12, wherein the analyzing a contaminated state of the reference specimen comprises:
aligning the reference specimen between the auxiliary support die and the objective lens unit;
acquiring image information of the reference specimen through the detector; and
analyzing the contaminated state from the image information using the computer system.

14. The inspection method according to claim 12, wherein the cleaning the reference specimen comprises injecting a cleaning gas onto the reference specimen using the cleaning device, the method comprising:
repeatedly executing the step of cleaning the reference specimen a predetermined number of times; and
replacing the reference specimen after the step of cleaning the reference specimen is executed the predetermined number of times.

15. The inspection method according to claim 12, wherein the acquiring a reference signal of the reference specimen comprises:
aligning the reference specimen between the auxiliary support die and the objective lens unit;
irradiating first incident light from the light source onto the reference specimen via the spectroscope and the objective lens unit;
transferring first reflected light reflected from the reference specimen to the detector via the objective lens unit and the imaging device, thereby acquiring first large-area spectral information by the detector; and
acquiring the reference signal from the first large-area spectral information using the computer system.

16. The inspection method according to claim 15, wherein:
the first large-area spectral information comprises at least four optical signals acquired at at least four measurement points two-dimensionally arranged to constitute at least two rows and at least two columns on the reference specimen; and
the reference signal is a median or a mean of the at least four optical signals.

17. The inspection method according to claim 12, wherein the acquiring a target signal of the target specimen comprises:
aligning the target specimen between the main support die and the objective lens unit;
irradiating second incident light from the light source onto the target specimen via the spectroscope and the objective lens unit;
transferring second reflected light reflected from the target specimen to the detector via the objective lens unit and the imaging device, thereby acquiring second large-area spectral information by the detector; and
acquiring the target signal from the second large-area spectral information using the computer system.

18. The inspection method according to claim 17, wherein:
the second large-area spectral information comprises at least four optical signals acquired at at least four measurement points two-dimensionally arranged to constitute at least two rows and at least two columns on the target specimen; and
the target signal is a median or a mean of the at least four optical signals.

19. The inspection method according to claim 12, further comprising providing the target specimen by forming a plurality of patterns on a semiconductor substrate, and the target signal comprises a target signal of the plurality of patterns.

20. A spectro-microscopic inspection (SMI) system comprising:
a main support die configured to receive a target specimen;
an auxiliary support die adjacent to the main support die and configured to receive a reference specimen;
a cleaning device configured to remove contaminants from the reference specimen;
an objective lens unit configured to direct light to the main support die from a light source adjacent to the objective lens unit;
a spectroscope between the objective lens unit and the light source;
a polarizer between the objective lens unit and the spectroscope;
a compensator between the objective lens unit and the polarizer;
a detector adjacent to the objective lens unit, the detector comprising a large-area charge coupled device;
an imaging device between the objective lens unit and the detector; and
a computer system in communication with the detector.

* * * * *